(12) United States Patent
Sztykiel et al.

(10) Patent No.: US 11,878,917 B2
(45) Date of Patent: Jan. 23, 2024

(54) RUGGEDIZED PORTABLE WATER TREATMENT SYSTEM

(71) Applicant: Blu Technology, LLC, Portage, MI (US)

(72) Inventors: John E. Sztykiel, Lansing, MI (US); Timothy A. Gerber, Louisville, KY (US); Shabtai C. Hirshberg, Oak Park, MI (US)

(73) Assignee: Blu Technology, LLC, Portage, MI (US)

( * ) Notice: Subject to any disclaimer, the term of this patent is extended or adjusted under 35 U.S.C. 154(b) by 352 days.

(21) Appl. No.: 17/306,050

(22) Filed: May 3, 2021

(65) Prior Publication Data

US 2022/0289593 A1 Sep. 15, 2022

Related U.S. Application Data

(63) Continuation-in-part of application No. 29/774,213, filed on Mar. 15, 2021, now Pat. No. Des. 968,555, (Continued)

(51) Int. Cl.
*B01D 29/56* (2006.01)
*B01D 35/26* (2006.01)
(Continued)

(52) U.S. Cl.
CPC ............... *C02F 1/002* (2013.01); *B01D 29/56* (2013.01); *B01D 35/15* (2013.01); *B01D 35/26* (2013.01);
(Continued)

(58) Field of Classification Search
CPC .. B01D 2201/202; B01D 29/56; B01D 35/15; B01D 35/26; B01D 35/30; C02F 1/002;
(Continued)

(56) References Cited

U.S. PATENT DOCUMENTS 5,997,737 A * 12/1999 Sturdevant ................ C02F 9/20
210/257.2
2012/0285897 A1* 11/2012 Fike ........................... C02F 9/00
210/85

FOREIGN PATENT DOCUMENTS

EP 1382578 B1 * 8/2007 ............. C02F 9/005

* cited by examiner

*Primary Examiner* — Terry K Cecil
(74) *Attorney, Agent, or Firm* — Gardner, Linn, Burkhart & Ondersma LLP (57) ABSTRACT

A ruggedized portable water treatment system having a protective exoskeleton that supports and enshrouds the principle operating components of the water treatment system. In one embodiment, the water treatment system includes a water pump and one or more water treatment components that are disposed within the protective confines of the exoskeleton. In one embodiment, the exoskeleton includes top and bottom plates that are joined by a central support and a plurality of external supports. The principle operating components of the water treatment system, such as the water pump and the water treatment components, are mounted to the central support and are fully contained within and protected by the external supports. The external supports are disposed outwardly of the water pump and the water treatment components to form a rigid cage configured to protect the internally positioned components.

19 Claims, 7 Drawing Sheets

Related U.S. Application Data and a continuation-in-part of application No. 29/774,211, filed on Mar. 15, 2021, now Pat. No. Des. 975,822.

(51) Int. Cl.
  *C02F 1/32* (2023.01)
  *C02F 1/00* (2023.01)
  *B01D 35/15* (2006.01)

(52) U.S. Cl.
  CPC .......... *C02F 1/32* (2013.01); *B01D 2201/202* (2013.01); *C02F 2201/006* (2013.01); *C02F 2201/007* (2013.01); *C02F 2209/03* (2013.01)

(58) Field of Classification Search
  CPC .. C02F 1/283; C02F 1/32; C02F 1/441; C02F 1/78; C02F 2201/006; C02F 2201/007; C02F 2201/009; C02F 2209/03
  See application file for complete search history.

RUGGEDIZED PORTABLE WATER TREATMENT SYSTEM

BACKGROUND OF THE INVENTION

The present invention relates to water treatment systems, and more specifically to portable water treatment systems.

Obtaining clean and safe drinking water is fundamental to life and continues to be a major concern for many people around the world. Despite major scientific advances, many people continue to struggle to acquire water that is fit for drinking as many natural sources of fresh water, such as streams, lakes and rivers, are not potable. This is true not only in underdeveloped regions, but also in many rural areas of more developed regions.

A wide range of efforts have been made to develop portable water treatment systems intended for use in providing drinking in remote environments. For the most part, these efforts have focused on larger water treatment systems that while technically portable are, as practical matter, too large and cumbersome for many application, or on personal water treatment systems that can be carried by an individual, but are too small to adequately meet the needs of a family or small group of individuals.

Only limited efforts have been focused on providing a portable water treatment system that is suitable for providing drinking water for a family or a small group of people, while at the same time remaining sufficiently portable and durable for a wide range of alternative applications. To address the need for durability in water treatment systems of this scale, one conventional water treatment system of this scale is offered with a protective case in which the system can be safely housed when not in use. The use of a protective case suggests that the water treatment system itself is not sufficiently rugged and durable without the case. The protective case also increases to overall size of the system and means the water treatment system must be un-cased before use and then re-cased after use.

Further, conventional water treatment systems of this nature are designed from the ground up to provide specific types of water treatment. However, it is also know that the types of water treatment needed can vary significantly from one application to another depending primarily on the nature of the water to be treated by the system. For example, in some application a pleated water filter that removes small particles may be sufficient to provide potable water, while in other applications activated carbon media, UV disinfection and other types of water treatment may be beneficial to provide the desire level of water treatment. The application-specific design and configuration of conventional water treatment systems makes it difficult to offer them with different water treatment options and all but eliminates the possibility of user-implemented adaptions, such as adding supplemental water treatment devices or swapping out interchangeable water treatment modules.

Accordingly, there remains room for improvement in the field of portable water treatment systems, and particularly as it relates to portable water treatment systems intended for use by a family or small group of people in remote environments, such as in camping and off-roading and other outdoor activities.

SUMMARY OF THE INVENTION

The present invention provides a ruggedized portable water treatment system having a protective exoskeleton that supports and enshrouds the principle operating components of the water treatment system. In one embodiment, the water treatment system includes a water pump and one or more water treatment components that are disposed within the protective confines of the exoskeleton. In one embodiment, the exoskeleton include top and bottom plates that are joined by a central support and a plurality of external support. The principle operating components of the water treatment system, such as the water pump and the water treatment components, are mounted to the central support and are fully contained within an internal space defined collectively by the external supports.

In one embodiment, the external supports of the exoskeleton are arranged in a radially symmetric pattern about the central support. In one embodiment, the exoskeleton may include five external supports, but the number of supports may vary from application to application. The spacing between adjacent external supports may be sufficient to allow maintenance on the water pump and/or the water treatment components. For example, when the water treatment components include one or more replaceable filter cartridges, the spacing may be selected to allow replacement of the filter cartridges through the gap between adjacent external supports.

In one embodiment, the top plate and bottom plate are generally pentagonal and the external supports are disposed in a radially symmetric pattern at the five corners of the pentagon. The pentagonal shape may be helpful in some applications as it provides significantly improved protection over a square or rectangular shape. Further, the pentagonal shape allows limited rolling of the exoskeleton if it is dropped or flipped onto its side.

In one embodiment, the exoskeleton is a modular assembly that can be stored and shipped in a broken down configuration, and then easily assembled by a consumer. In one embodiment, the top plate, bottom plate, central support and external supports are separately manufactured as generally planar components. The exoskeleton is assembled by installing the central support and external supports between the top plate and the bottom plate. The central support and the external supports may be mounted between the top plate and the bottom plate by fasteners, such as screws, bolts/nuts or other threaded fasteners. Threaded inserts may be affixed at one or more of the fastening points to provide strong and secure attachments for the fasteners.

In one embodiment, the water treatment system is capable of treating water received from a pressurized source or from a non-pressurized source. In this embodiment, the water treatment system includes a water pump with an integrated pressure sensor or pressure-actuated switch. When a pressurized source of water is connected to the water treatment system, the water pressure actuates the control switch, which in turn prevents the pump from being powered on and instead allows the pressurized water to bypass the pump and flow directly to the water treatment components. When the water treatment system is powered in the absence of a sufficiently pressurized water source, the water pump will be engaged to allow the pump to draw water into the water treatment system from a non-pressurized water sources, such as a lake, river or stream.

In one embodiment, the water pump is disposed in the lower one-half of the exoskeleton to provide the water treatment system with a lower center of gravity that enhances stability and reduces the risk of tipping.

In one embodiment, the water treatment components include a pair of water filter assemblies. In one embodiment, the water filter assemblies are disposed in a vertically stacked arrangement on one side of the central support. In one embodiment, each water filter assembly includes a mounting plate, a pressure vessel and a water filter cartridge that is readily replaced. The pressure vessel may include a manifold portion and a removable cover portion that cooperatively define space confined to receive a replaceable filter cartridges. The removable portion may be mounted to the manifold portion using an attachment structure that permit easy removal from and replacement onto the manifold portion, for example, using a conventional threaded mounting system. The water filter assemblies may be arranged in series or in parallel. For example, the water treatment assemblies may be arranged in series to sequentially treat water using both filter cartridges. As another example, the water treatment assemblies may be arranged in parallel to allow the water to be divided into two streams with each stream being treated by a different filter cartridge. In one embodiment, the first water filter cartridge is a 5 micron carbon filter and the second water filter cartridge is a 0.2 micron pleated electropositive filter. In alternative embodiment, the two separate water filter assemblies may be replaced by a single water filter assembly. For example, a single larger water filter assembly may be fitted into the space occupied by the two separate filter assemblies. However, the use of two separate, stacked water filter assemblies permits one of the water filter assemblies to be positioned upstream from the water pump, thereby allowing it to filter incoming water before it reaches the water pump. In one embodiment, the water flow path is arranged so that water entering the system flows in sequence through the first water filter assembly, the water pump and then the second water treatment assembly.

In one embodiment, the water treatment system includes a control panel mounted between a pair of external supports. In one embodiment, the control panel includes an on/off switch, a power input plug for connecting an external source of power, an untreated water inlet and a treated water outlet. The control panel may be mounted to the inside of the external supports to provide the control panel with some protection. In one embodiment, the power input plug is a standardized plug. In some applications, the system may be provided with an integrated source of power, such as a rechargeable battery or other electrical energy storage device. The integrated power source may supplement or replace the power input. For example, the water treatment system 10 may be capable of operating directly from an external source of power or an internal rechargeable battery. When the system includes an integrated rechargeable battery, the system may include an integrated battery charger that is configured to recharge the battery when the system is connected to an adequate source of external power. Any onboard electrical energy storage device and any associated charger may be mounted to central support.

In one embodiment, the water treatment system includes a 12V DC power input that is capable of powering the water pump and any other accessories, such as an optional light source or an electrically power water treatment device (e.g. a UV water treatment module or an ozone treatment module). The 12V DC power input allows the system to be powered by a wide range of conventional power supplies, such a wide range of deep cycle batteries, as well as many conventional solar panel assemblies and other alternative power supplies. In alternative embodiments, the system may be configured to operate on other types of electrical power, including other voltage levels and other power formats (e.g. AC power).

In one embodiment, flexible water lines extend between the control panel and the internally disposed water treatment components. For example, a first flexible water line may extend from the water inlet on the control panel to the first water filter assembly and a second flexible water line may extend from the water outlet on the control panel to the immediately preceding water treatment components (e.g. the second water filter assembly or the optional UV water treatment module). Flexible water lines facilitate assembly and maintenance of the system, and also reduce the risk that impact to the control panel will be communicated to and damage the water treatment components. In one embodiment, all of the water supply line within the system are flexible and are attached by hose clamps that are permanently attached to prevent shifting from thermal or other physical stresses that could cause leaks.

In one embodiment, the water treatment system includes an ultraviolet ("UV") water treatment module. The UV water treatment module may supplement or replace one or both of the water filter assemblies. The UV water treatment module may be mounted to the central support. In one embodiment, the UV water treatment module is mounted to the central support above the water pump, and the UV water treatment module includes an electrical ballast that is also mounted to the central support. The UV water treatment module may be positioned in essentially any location along the water flow path. For example, when the system includes the water filter assemblies and the UV module, the UV module may be positioned upstream or downstream from the filter assemblies. In some applications, the UV water treatment module may be disposed inline between two water filter cartridges.

In one embodiment, the water treatment system includes an ozone water treatment module that supplements or replace one or both of the water filter assemblies. The ozone water treatment module may be mounted to the central support and may be positioned in essentially any location along the water flow path. For example, the ozone module may be positioned upstream from, downstream from or between the filter cartridges. In one embodiment, the ozone treatment module that is mounted to the central support above the water pump.

In one embodiment, the water treatment system includes an integrated light source, such as an LED light or bank of LEDs. The light source may be mounted to the central support and may be configured to illuminate whenever power is connected to the unit. Alternatively, the light may be configured to operate only when turned on by the user, or in response to operating conditions. The light source may be a single color or multicolor light source. When a multicolor light source is used, the color may be varied to reflect operating status, operating conditions, maintenance status or convey other messages to the user. For example, a white light may be used for general illumination, a green light to indicate that water is being filtered, a blue light may be used when an optional UV treatment module is operating and a red light may be used when a filter requires replacement.

The current embodiments provide a ruggedized water treatment system that is portable, but scaled to clean a sufficient volume of water for a family or small group of people. The exoskeleton provide a rugged and durable structure with an internal central support that securely mounts the water treatment components within the protection of an outer arrangement of external supports. The principle water treatment components are mounted to the central support rather than the external supports. This protects the principle water treatment components from being directly affected by impacts to the protective external supports. It also leaves the external supports open to facilitate their use in carrying or mounting the portable water treatment system 10 to a vehicle by one or more of the external supports. The use of identical water filter assemblies, including identical mounting plates and identical pressure vessels, allows standardization and facilitates manufacture, assembly and maintenance. The use of flexible water lines at least between the control panel and the internal water treatment components helps to protect the water treatment components from damage that might otherwise be caused by impacts communicated along the water lines. The central support also includes a standardized mounting points that are capable of receiving additional or alternative water treatment components, such as a UV water treatment module or an ozone water treatment module. The water treatment system can also include an integrated light source that not only helps to provide sufficient light to operate the system in the dark, but may also function as a lantern to provide light for other purposes.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

A. Overview

Figure 1:
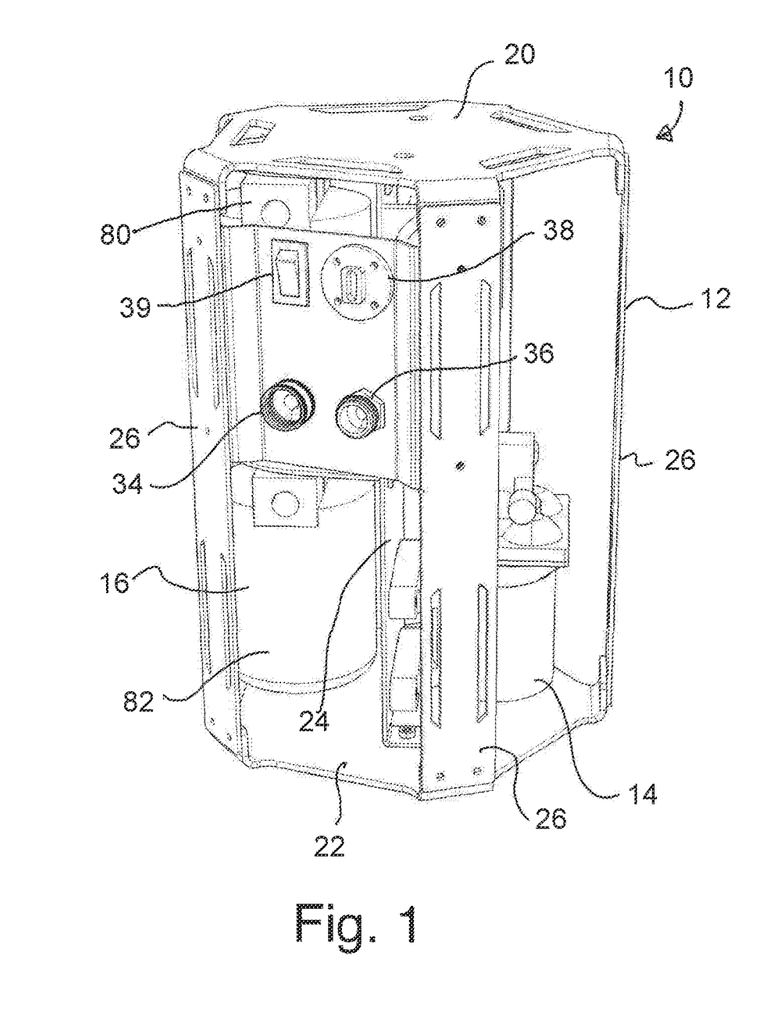
FIG. 1 is a first perspective view of a portable water treatment system in accordance with and embodiment of the present invention.
Figure 2:
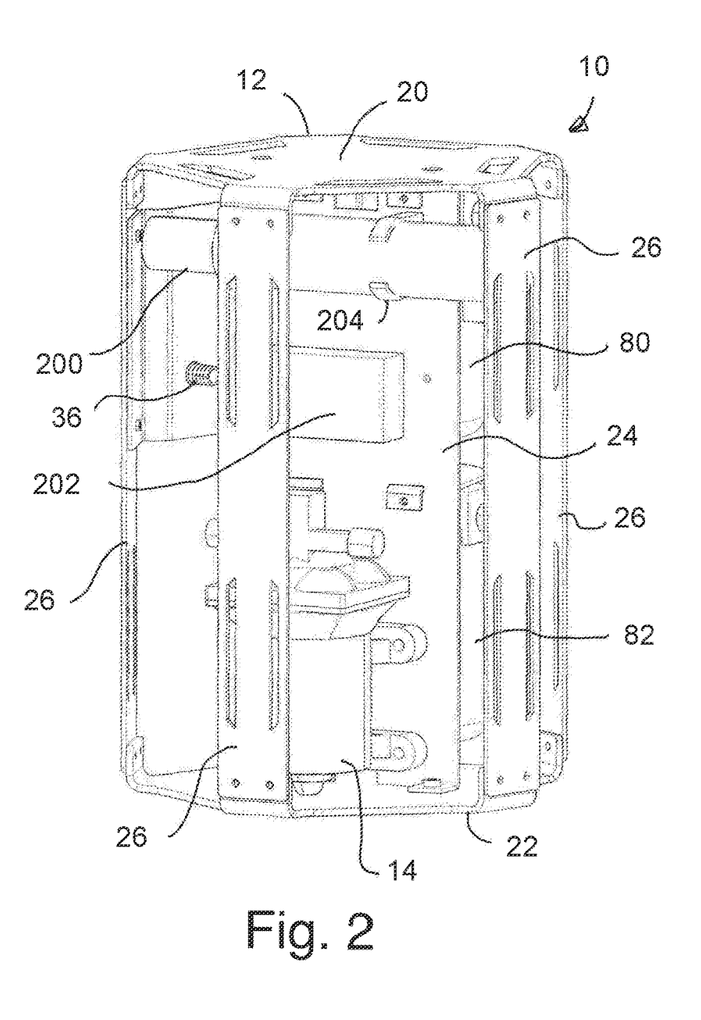
FIG. 2 is a second perspective view of the portable water treatment system.
Figure 3:
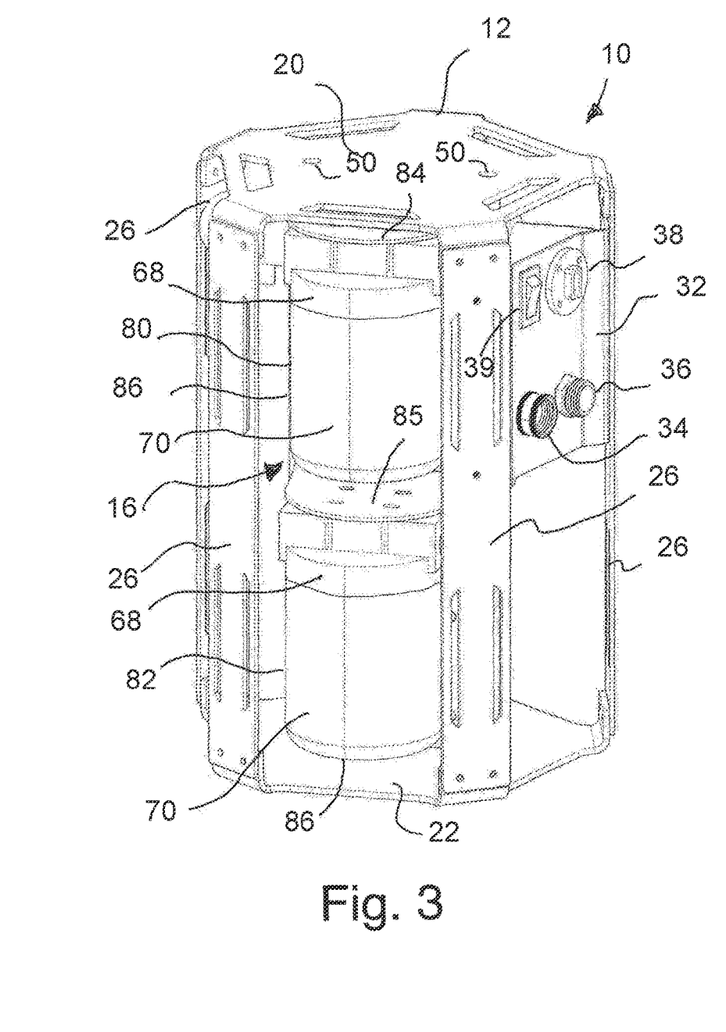
FIG. 3 is a third perspective view of the portable water treatment system.
Figure 6:
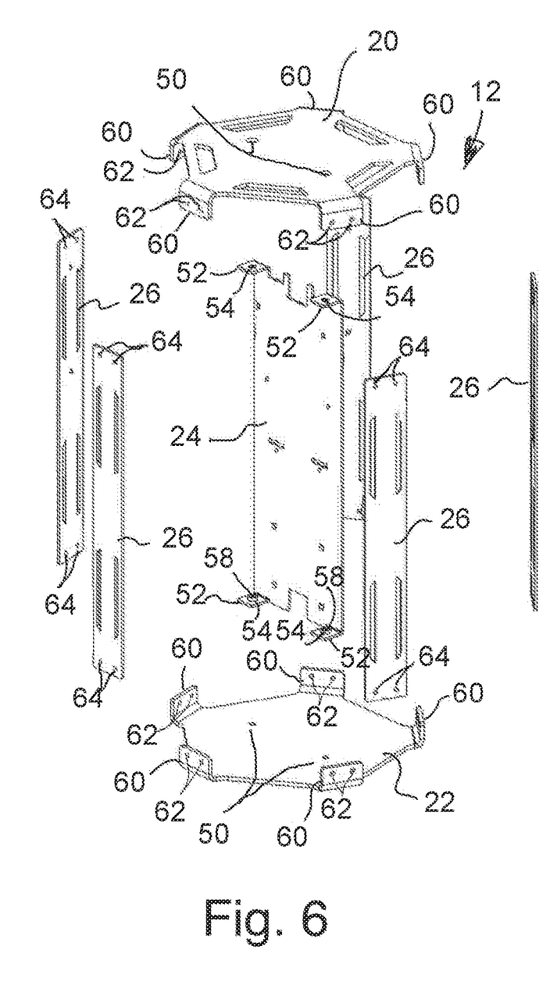
FIG. 6 is an exploded perspective view of the exoskeleton.
Figure 12:
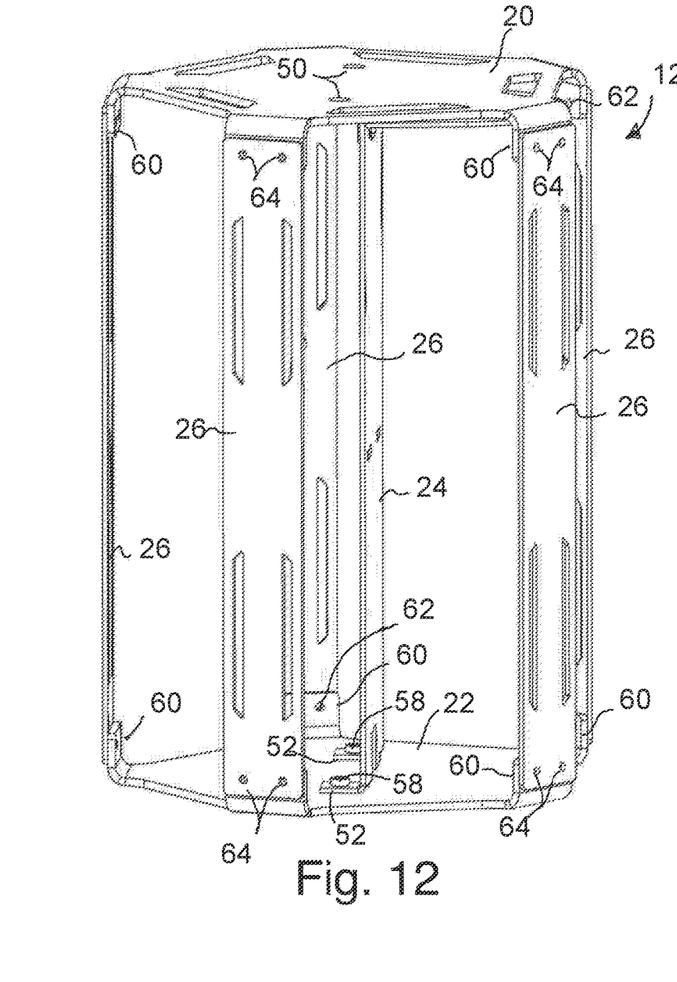
FIG. 12 is a perspective view of the exoskeleton.

A ruggedized portable water treatment system 10 in accordance with an embodiment of the present invention is shown in FIGS. 1-3. In this embodiment, the water treatment system 10 generally includes an exoskeleton 12, a water pump 14 and at least one water treatment device 16. The exoskeleton 12 generally includes a top plate 20, a bottom plate 22, a central support 24 and a plurality of external supports 26 (See FIGS. 6 and 12). The central support 24 extends between the top plate 20 and the bottom plate 22 to form an upright upon which the principle operative components are mounted, such as the water pump 14 and the at least one water treatment device 16. The plurality of external supports 26 extend between the top plate 20 and the bottom plate 22 to form a protective cage around the water treatment system 10. The water pump 14 of the illustrated embodiment is configured to receive power from a conventional 12V DC power source, and includes an integrated pressure sensor that engages the water pump 14 only when the water treatment system 10 is connected to a non-pressurized water source. The water treatment system 10 includes a control panel 32 that is mounted between an adjacent pair of external supports 26. The control panel 32 includes a water inlet 34, a water outlet 36 and a power inlet 38. Flexible supply lines extend between the water inlet 34 and the water outlet 36 on the control panel 32 to the internally disposed water treatment components.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

B. Ruggedized Portable Water Treatment System

Figure 4:
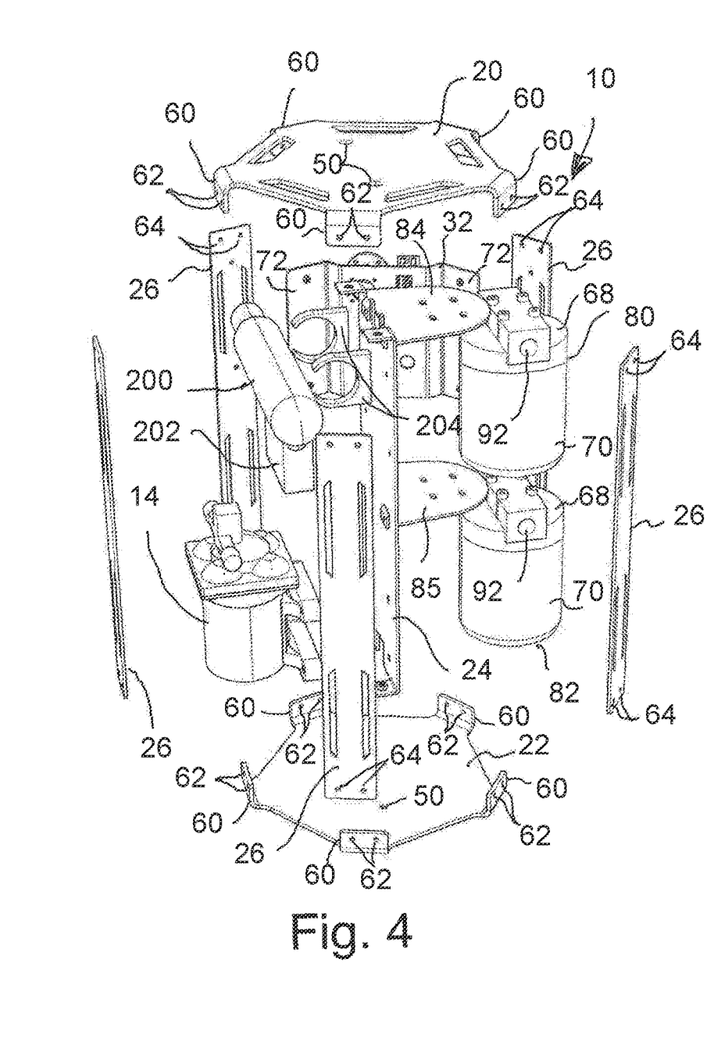
FIG. 4 is a first exploded perspective view of the portable water treatment system.
Figure 5:
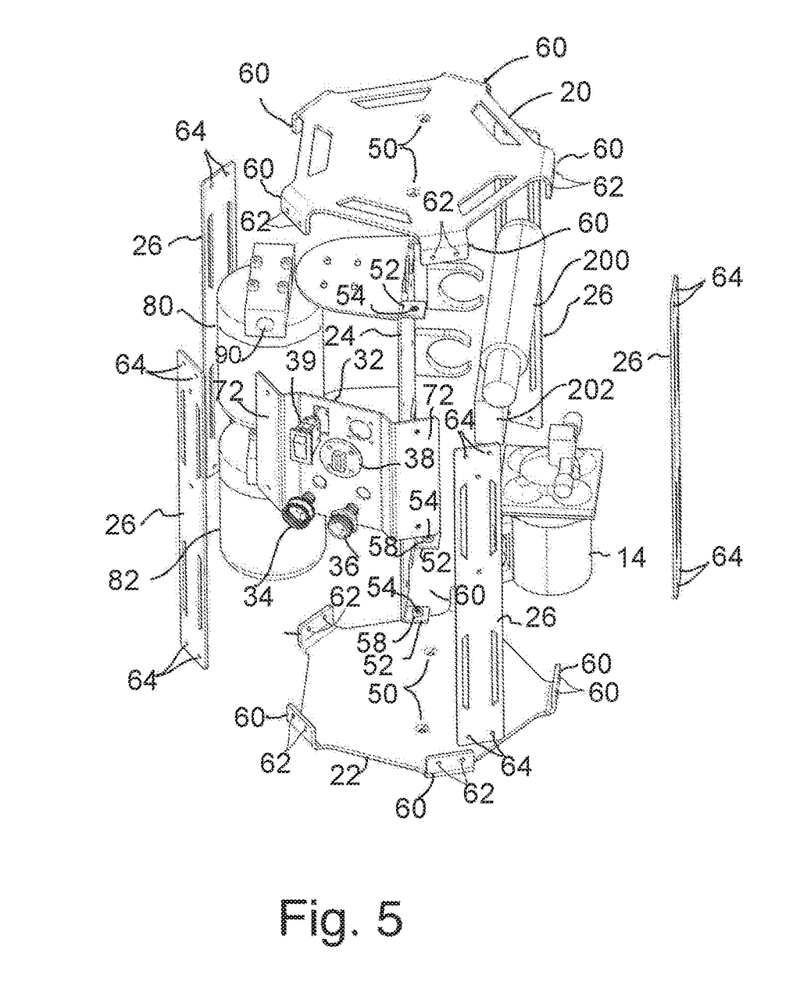
FIG. 5 is a second exploded perspective view of the portable water treatment system.
Figure 10:
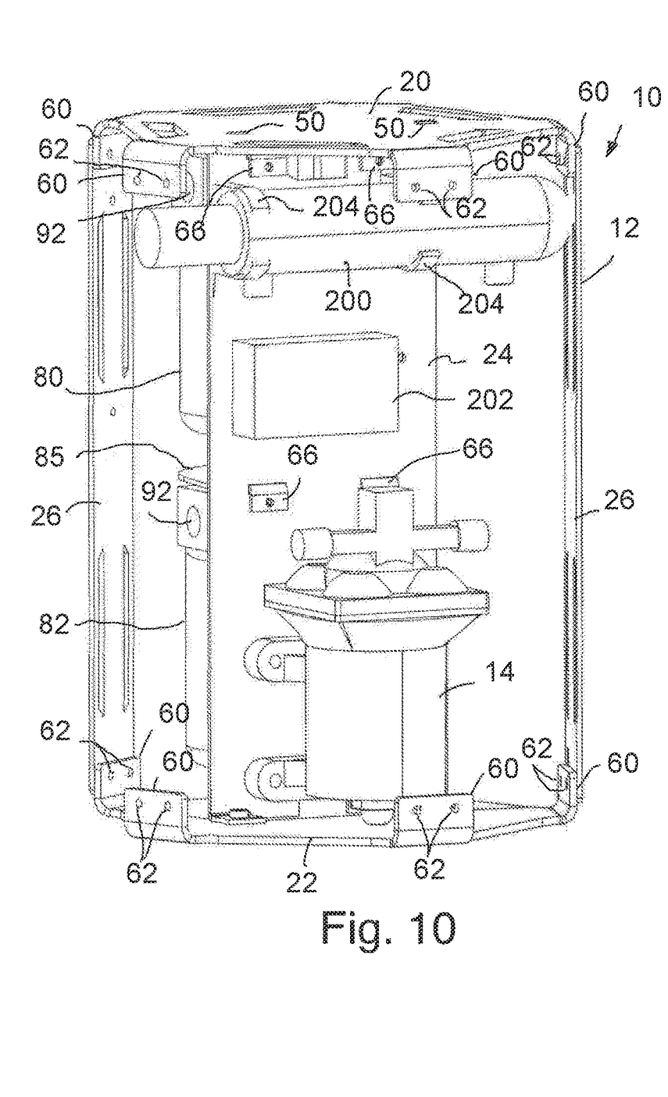
FIG. 10 is a perspective view of the portable water treatment system with portions removed to show the water pump and UV treatment module.
Figure 11:
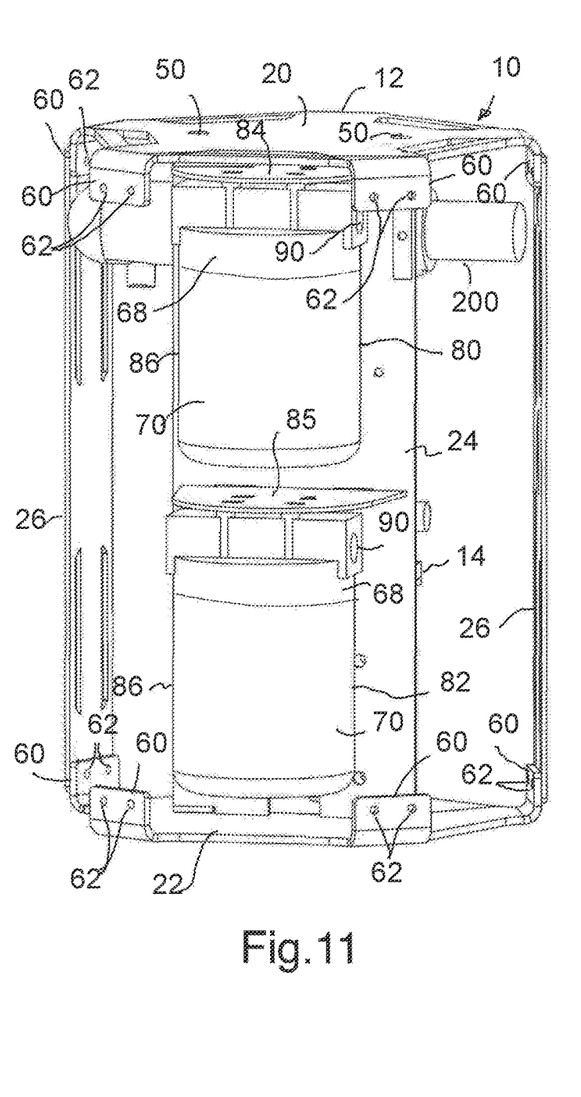
FIG. 11 is a perspective view of the portable water treatment system with portions removed to show the water filter assemblies.

As noted above, the ruggedized portable water treatment system 10 of FIGS. 1-3 generally includes an exoskeleton 12, a water pump 14 and at least one water treatment device 16. In general terms, the exoskeleton 12 provides a structural framework for the water treatment system 10, the water pump 14 provides a mechanism for moving water through the water treatment system 10 and the at least one water treatment device 16 removes impurities from the water moved through the system 10. Although the number and type of water treatment devices 16 incorporated into the system 10 may vary from application to application, the portable water treatment system 10 of FIG. 1 includes a pair of water filter assemblies 80 and 82 and a UV water treatment module 200. FIGS. 4 and 5 are exploded perspective views of the water treatment system 10 from roughly opposite sides. FIGS. 10 and 11 show the water treatment system 10 with portions removed to provide clear views of the water pump 14, the UV treatment modules 200 and the water filter assemblies 80 and 82.

In the illustrated embodiment, the exoskeleton 12 provides an internal structure for mounting and supporting the principle components of the water treatment system 10, as well as defining a protective cage that enshrouds and protects the internally supported principle components. In the illustrated embodiment, the exoskeleton 12 is assembled from a plurality of discrete components, each of which is generally planar. This allows for compact storage and shipping of the exoskeleton 12. As perhaps best shown in FIG. 6, the exoskeleton 12 includes a top plate 20, a bottom plate 22, a central support 24 disposed toward the center of the exoskeleton 12 and a plurality of external supports 26 arranged around the periphery of the exoskeleton 12.

The top and bottom plates 20 and 22 form the top and bottom structural components of the exoskeleton 12. As shown in FIGS. 1-3, the central support 24 and the external supports 26 are affixed to and extend between the top plate 20 and the bottom plate 22 to complete the exoskeleton12. In the illustrated embodiment, the top and bottom plates 20 and 22 are generally identical (although the top plate 20 includes some primarily aesthetic cutouts that are not present in the bottom plate 22) and are spaced apart from one another in a mirror image orientation. In this embodiment, the top plate 20 and the bottom plate 223 are generally pentagonal in peripheral shape are configured with a central mounting point for the central support 24 and five peripheral mounting points for to the external supports 26. Although the central mounting point may vary from application to application, in the illustrated embodiment, the top and bottom plates 20 and 22 each define a pair of mounting holes 50 that allow the central support 24 to be connected to the top and bottom plates 22 by fasteners as described in more detail below. In this embodiment, the top and bottom plates 20 and 22 each include five radially symmetric mounting points disposed at the five "corners" of the pentagonal periphery. In this embodiment, each mounting point includes a generally planar flange 60 that extends inwardly from the main body of each plate 20 and 22. Each flange 60 defines a pair of mounting holes 62 that allow attachment of the external supports 26 by fasteners as described in more detail below.

Figure 7:
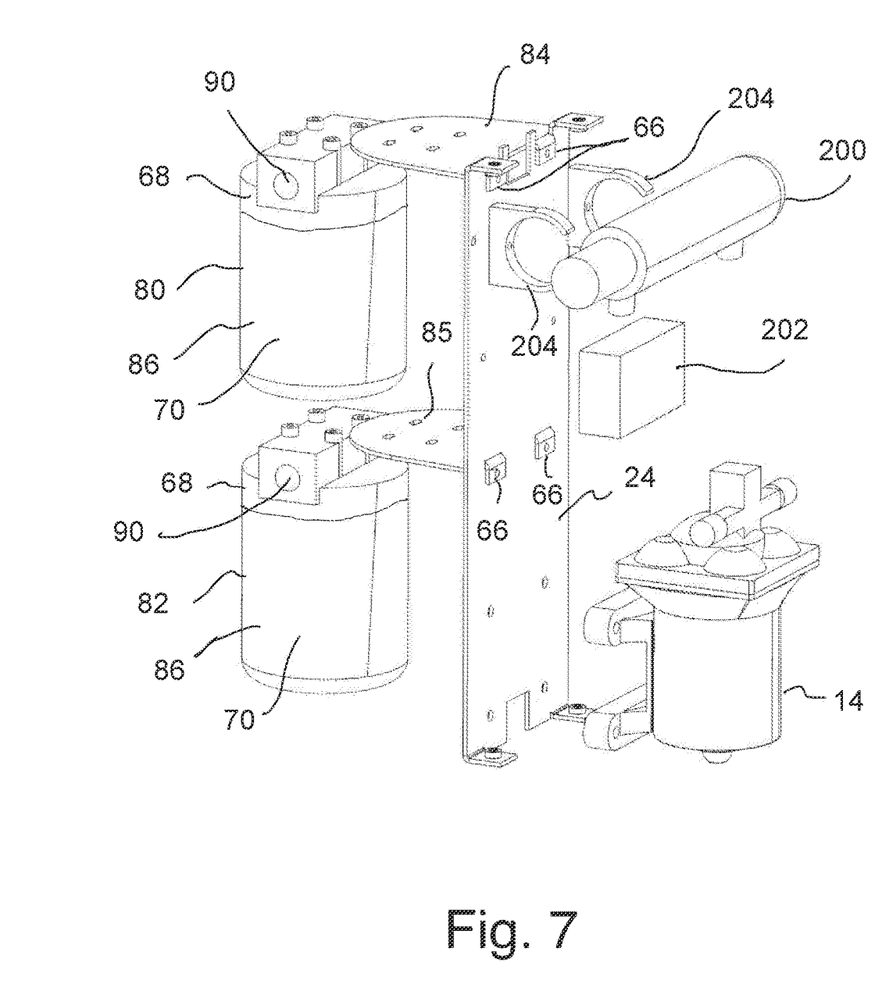
FIG. 7 is an exploded perspective view of the central support and the principle components of the water treatment system.

In the illustrated embodiment, the central support 24 is an elongated, generally rectangular member configured to extend between the top and bottom plate 20 and 22, respectively. The central support 24 is configured to receive and support the principle operating components of the water treatment system 10, and includes a plurality of mounting points for the water pump 14 and the water treatment devices 16 (including the water filter assemblies 80 and 82 and the UV treatment module 200). FIG. 7 is an exploded perspective view isolating the central portion 24 and the principle components of the water treatment system 10. As perhaps best shown in FIG. 6, a pair of mounting flanges 52 extend from each end of the central support 24. A mounting hole 54 is defined in each flange 52. In the illustrated embodiment, each mounting hole 54 is fitted with a threaded insert 58 to facilitate assembly and provide a strong and durable threaded connection. During assembly, a mounting screw is fitted inwardly through each of the mounting holes 50 in the top plate 20 and bottom plate 22 and threaded into a corresponding one of threaded insert 58 in the central support 24.

As described above, the external supports 26 extend between the top and bottom plates 20 and 22, and are disposed in a radially symmetric arrangement around the periphery of the exoskeleton 12. Like the central support 24, the external supports 26 are elongate, generally rectangular members. A pair of mounting holes 64 is defined in each end of the external supports 26. During assembly, a mounting screw is fitted inwardly through each of the mounting holes 64 in the external support 26 and the corresponding mounting holes 62 in the underlying flange 52. The mounting holes 62 in the flange 52 may be threaded to receive the fasteners or the mounting screws may extend entirely through the external support and the underlying flange and be fitted with a nut. In alternative embodiments, a threaded insert (not shown) may be fitted over each mounting hole 62. It should be noted that the mounting structure for joining the top plate, bottom plate, central support and external supports may vary from application to application. Further, in some applications one or more of the external supports may be integrally formed with the top plate and/or the bottom plate. For example, the mounting flanges on the top plate 20 and bottom plate 22 may be extended to form the external supports 26. In one implementation, the flanges on the top plate and the bottom plate may each be extended to approximately ½ the desired height of the exoskeleton 12 and the flanges of the top plate can be joined with corresponding flange of the bottom plate to form the external cage.

Figure 8:
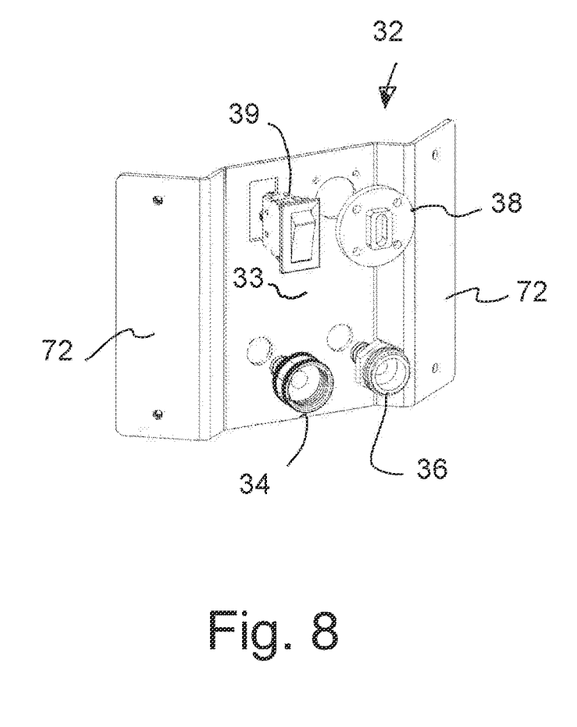
FIG. 8 is an exploded perspective view of the control panel.

The water treatment system 10 of the illustrated embodiment includes a control panel 32 that is mounted to the exoskeleton 12 (See FIGS. 1 and 8). In the illustrated embodiment, the control panel 32 includes a pair of mounting wings 72 that provide a mounting structure for securing the control panel 32 to the exoskeleton 12. For example, in the illustrated embodiment, the control panel 32 is mounted between a pair of adjacent external supports 26, for example, by bolts, screws, rivets or other fasteners that join the mounting wings 72 to the external supports 26. The mounting wings 72 extend forwardly such that the control panel 32 is recessed inwardly from external supports 26. This helps to protect the various components mounted on the control panel 32. The control panel 32 is mounted to the inside of the external supports 26 and includes a recessed central portion 33 that is protected to some degree by the external supports 26. The control panel 32 of the illustrated embodiment includes a water inlet 34, a water outlet 36, a power inlet 38 and an on/off switch 39. The water inlet 34 may be a conventional water fitting that allows a source of untreated water to be connected to the water treatment system 10. Similarly, the water outlet 36 may be a conventional water fitting that allows an external water line to be connected to the water treatment system 10 receive the treated water discharge.

In the illustrated embodiment, the water treatment system 10 includes a water pump 14 capable of moving water through the at least one water treatment device 16 at the desired flow rate. For example, the water pump 14 of the illustrated embodiment provides a nominal flow rate of about three gallons per minute. However, the effective flow rate of the water pump 14 may be more in the range of 1½ to 2 gallons per minute when restricted by the various components in the water flow path. The water pump 14 is mounted to the central support 24, for example, by fasteners. In one embodiment, the water pump 14 is attached to the central support 24 by screws. In an alternative embodiment, the water pump 14 is attached to the central support by rivets. In the illustrated embodiment, the water pump 14 is a 12VDC electrically powered pump. The water pump 14 is electrically coupled to the power inlet 38 on the control panel 32. In the illustrated embodiment, the water pump 14 includes a bypass valve with integrated pressure switch. For example, the water pump 14 may be a PDS-4008-101-A65 model pump available from Shurflo. When the water pump 14 is connected to a source of water with sufficient pressure, the pressure sensor is tripped, which prohibits activation of the pump 14 and routes incoming water through the bypass valve directly to the water treatment component. In alternative embodiments, other types and styles of water pumps may be provided.

As noted above, the water treatment system 10 includes at least one water treatment device 16 configured to treat the water passing through the system 10. Although the number and type of water treatment devices 16 incorporated into the system 10 may vary from application to application, the water treatment system 10 of the illustrated embodiment includes two water filter assemblies 80 and 82. In the illustrated embodiment, the water filter assemblies 80 and 82 are mounted to and supported by the central support 24 in a vertically stacked arrangement. Each water filter assembly 80 and 82 generally includes a pressure vessel 86 that is affixed to the exoskeleton 12 and a replaceable filter cartridge that is removably mounted within the pressure vessel 86 (See FIG. 7). In this embodiment, the top water filter assembly 80 is coupled to the central support 24 by a top mounting plate 84 and the bottom water filter assembly 82 is mounted to the central support 24 by a bottom mounting plate 85. The mounting plates 84 and 85 of this embodiment each include a pair of mounting tabs 66 that pass through slots in the central support 24 and are fastened thereto, for example, by screws or other fasteners (not shown). The mounting plates 84 may be mounted to the central support 24 using other mounting structures, including other removable attachments, such as snap-fit attachments, or permanent forms of attachment, such as welding. In alternative embodiments, the mounting plates 84 may be integrally formed with the central support 24. For example, in alternative embodiments, the mounting plates 84 may be cut from and folded out of the main body of the central support 24.

In the illustrated embodiment, two pressure vessels 86 of equal size are positioned one atop the other in a vertically spaced relationship to house two filter cartridges. Each pressure vessel 86 is affixed to a corresponding mounting plate 84 and 85, for example, by four screws or other threaded fasteners that extend through the mounting plate 84 or 85 into screw bosses in the pressure vessel 86. Each pressure vessel 86 includes an upper manifold portion 68 that remains affixed to the corresponding mounting plate 84 and 85, and a bottom cover portion 70 that is removably joined to the upper manifold portion. The upper manifold portion and the bottom cover portion cooperatively define an internal space configured to house a filter cartridge. In this embodiment, the upper manifold portion and the bottom cover portion may are joined by a threaded arrangement (or other similar arrangement) that allows the bottom cover portion 70 to be easily removed from the upper manifold portion 68 to gain access to the filter cartridge disposed therein. In the illustrated embodiment, each upper manifold portion 68 includes a water inlet 90 and a water outlet 92. A variety of conventional pressure vessels suitable for use in the illustrated embodiment are commercially available. In one embodiment, each pressure vessel may be a 5" canister, such as model number HF-SQHWH12 available from Hydronix. In alternative embodiments, the water treatment system 10 may incorporate different types of filter assemblies. For example, in one alternative embodiment, each filter assembly may include a manifold and a replaceable filter cartridge with integrated pressure vessel.

The filter cartridges contained in the top and bottom filter assemblies 80 and 82, respectively, may vary from application to application. For example, the type of each filter cartridge may be selected, in part, on the design and configuration of the water flow path, the impurities in the water to be treated and the presence/absence of other water treatment devices in the water treatment system 10. In the illustrated embodiment, the bottom water filter assembly 82 is configured to treat water before it reaches the water pump 14 and the top water filter assembly 80 is configured to provide supplemental treatment of the water after it passes through the water pump 14. In this context, the two water filter assemblies 80 and 82 include different types of filter cartridges. In the illustrated embodiment, the filter cartridge in the bottom filter assembly 82 may be a conventional 5 micron carbon water filter cartridge. A variety of suitable 5 micron carbon water filters are commercially available. The filter cartridge 88 in the top filter assembly 80 may be a conventional pleated water filter cartridge, such as a 0.2 micron pleated electropositive filter, that may include an antimicrobial additive and/or powered activated carbon or a carbon block stage. For example, the filter cartridge 88 in the top filter assembly 80 may be a NanoCeram or NanoCeram PAC Filter available from Argonide Corporation. As noted above, the filter cartridges may, in alternative applications, be of a different type or style. For example, one or both of the filter cartridges may incorporate an alternative or different type of filter media, such as an activated carbon, catalytic carbon, kinetic degradation fluxion, reverse osmosis membrane, activated aluminum, manganese dioxide and/or mixed media. Although the water filter assemblies of the illustrated embodiment are arranged along the water flow path in series, it should be noted that the water filter assemblies 80 and 82 may alternatively be arranged in parallel. For example, the water filter assemblies 80 and 82 may be arranged in parallel to allow the water to be divided into two streams with each stream being treated by a different filter assembly 80 and 82.

In alternative applications, the two filter assemblies 80 and 82 may be replaced by a single larger filter assembly (not shown) that occupies roughly the same space as the filter assemblies 80 and 82. For example, in one alternative embodiment, the two pressure vessels and their separate filter cartridges may be replaced by a single larger pressure vessel and single larger filter cartridge that is approximately twice their height.

In the illustrated embodiment, the water treatment system 10 includes an ultraviolet ("UV") water treatment module 200 that supplements the water filter assemblies 80 and 82. The UV water treatment module 200 of this embodiment is mounted to the central support 24, for example, by a pair of mounting brackets 204 that are secured to the central support 24 by screws, bolts, rivets or other fasteners. The illustrated UV treatment module 200 includes a separate ballast 202 that is secured to the central support 24 by screws, bolts, rivets or other fasteners. In alternative embodiments, the ballast may be integrated into the UV treatment module 200. In this embodiment, the UV water treatment module 200 and the ballast 202 are mounted to the central support 24 above the water pump 14. In this embodiment, the ballast 202 receives power from the power inlet on the control panel 32. More specifically, the ballast 202 is electrically connected to the power inlet 38 to receive 12VDC from an external source of power. The ballast 202 is, in turn, electrically connected to the UV treatment module 200 to supply power to the enclosed source of UV light. The UV water treatment module 200 may be positioned in essentially any location along the water flow path. For example, when the water treatment system 10 also includes one or more water filter assemblies 80 and 82, the UV module 2000 may be positioned downstream from the filter assemblies 80 and 82 to sterilize the water after it has been filtered. In some applications, the UV water treatment module 200 may alternatively be disposed upstream or between two water filter assemblies 80 and 82.

Figure 9:
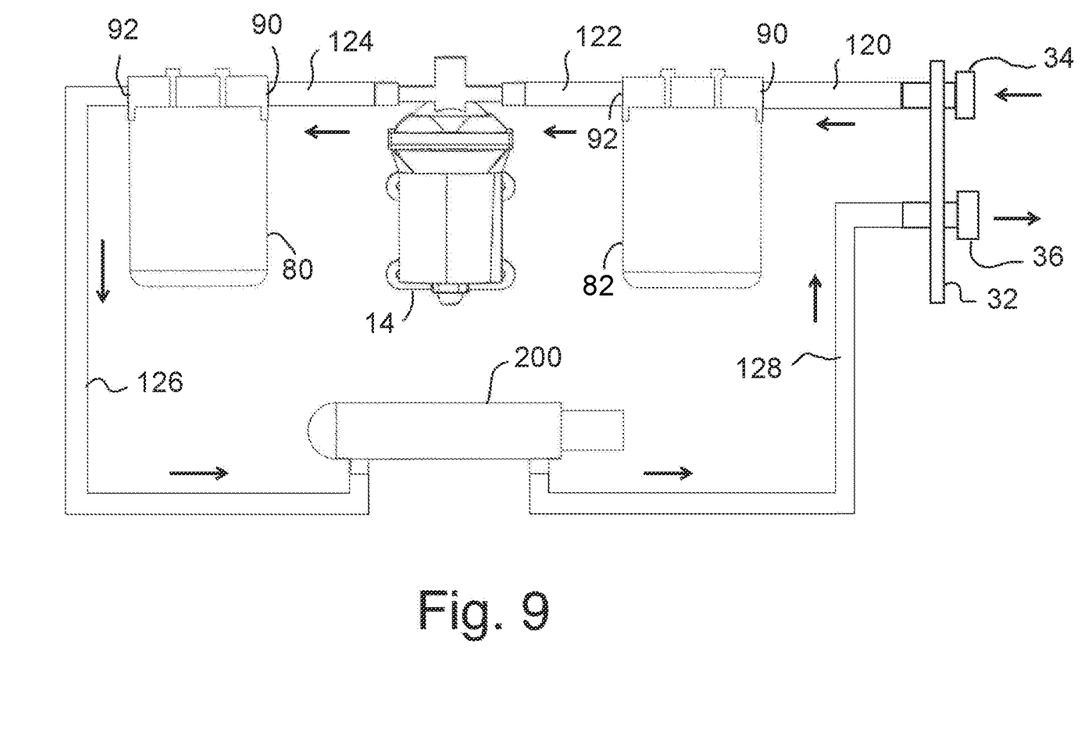
FIG. 9 is a schematic representation of the water flow path through the portable water treatment system of the illustrated embodiment.

Although the water flow path may vary from application to application, the path by which water flows through the illustrated embodiment is shown in schematic representation in FIG. 9. In this embodiment, water enters the system through the water inlet 34 on the control panel 32 and then flows sequentially through the bottom filter assembly 82, the water pump 14, the top filter assembly 80, the UV treatment module 200 and then returns to water outlet 36 on the control panel 34. As shown schematically in FIG. 9, a first water supply line 120 is connected from the water inlet 34 on the control panel 32 to the water inlet 90 of the bottom water filter assembly 82, a second water supply line 122 is connected from the water outlet 92 of the first water filter assembly 82 to the inlet of the water pump 14, a third water supply line 124 is connected between the outlet of the water pump 14 and the water inlet 90 of the top water filter assembly 80, a fourth water supply line 126 is connected between the water outlet 92 of the top water filter assembly 80 and the water inlet of the UV treatment module 200 and a fifth water supply line 128 is connected between the water outlet of the UV treatment module 200 and the water outlet 36 on the control panel 32. The water supply lines may be flexible supply lines and they may be connected by hose clamps that allow the supply lines to be easily attached and removed for assembly, disassembly and maintenance. In alternative embodiments that do not include a UV treatment module 200, the fourth water supply line 126 may extend between the water outlet 92 of the top filter assembly 80 and the water outlet 36 on the control panel 32.

As discussed above, the water treatment system 10 includes at least one water treatment devices 16. The number and type of water treatment devices may vary from application to application with the desired water treatment devices typically mounted to the central support 24 and operatively joined together by water supply lines that move the water through the various water treatment devices in the desired order. As discussed above, the water treatment system 10 of the illustrated embodiment includes two water filter assemblies 80 and 82 and ultraviolet ("UV") water treatment module 200. In alternative embodiments, the UV water treatment module 200 may be eliminated and water may be treated only by the two water filter assemblies 80 and 82. In other embodiments, the UV water treatment module may be replaced by an alternative water treatment device. For example, in alternative embodiments, the water treatment system 10 may include an ozone water treatment module (not shown) that may supplement or replace one or both of the water filter assemblies and/or the UV treatment module. The ozone water treatment module may be mounted to the central support 24 and may be positioned in essentially any location along the water flow path. For example, the ozone module may be positioned upstream from, downstream from or between the filter cartridges. In one embodiment, the ozone treatment module is mounted to the central support above the water pump in place of the UV treatment module 200.

Figure 13:
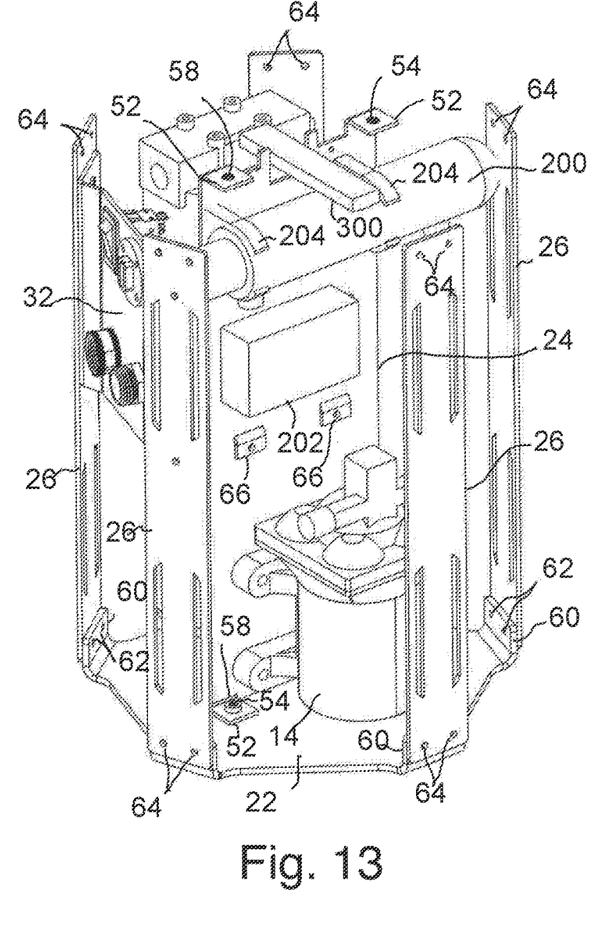
FIG. 13 is a perspective view of an alternative water treatment system incorporating a light assembly with portions removed to show the light assembly.

In an alternative embodiment shown in FIG. 13, the portable water treatment system 10 also includes an integrated visible light assembly 300. FIG. 13 shows the portable water treatment system 10 with the top plate 20 and the top mounting bracket 84 removed to show the light assembly 300. In the illustrated embodiment, the light assembly 300 of the illustrated embodiment generally includes a housing and an array of visible-light LEDs. The light assembly 300 of the illustrated embodiment is mounted to the central support 24. As shown, the light assembly 300 of FIG. 13 is seated in a notch formed in the top end of the central support 24 with portions of the light assembly 300 situated on both sides of the central support 24. This allows the light assembly 300 to shed light on both sides of the central support 24. In alternative embodiments, the light assembly may be situated on only one side of the central support 24. The light assembly 300 may be configured to illuminate whenever power is connected to the unit. Alternatively, the light assembly 300 may be configured to operate only when turned on by the user (e.g. operation of a dedicated switch), or in response to operating conditions (e.g. turn on when the system is treating water). The light assembly 300 may be configured to receive 12VDC and may be electrically connected to the power input 39 on the control panel 32. The light source may be one or more single color or multicolor LEDs. When a multicolor light source is used, the illumination color may be varied to reflect operating status, operating conditions, maintenance status or convey other messages to the user. For example, a white light may be used for general illumination, a green light to indicate that water is being filtered, a blue light may be used when an optional UV treatment module is operating and a red light may be used when a filter requires replacement.

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z ; Y, Z, and/or any other possible combination together or alone of those elements, noting that the same is open ended and can include other elements.

What is claimed is:

1. A portable water treatment system comprising:
a water pump;
a water treatment component; and
an exoskeleton comprising a top plate and a bottom plate; a central axis extending through the top and bottom plates; a central support positioned proximate the central axis; and a plurality of external supports spaced outwardly from the central support to define an outer periphery of the water treatment system, the plurality of external supports approximately evenly spaced about the outer periphery, wherein each of the central support and plurality of external supports extend between and are connected to the top and bottom plates, wherein the water pump and water treatment component are mounted to the central support and are fully disposed within the confines of the external supports, and wherein the water treatment system can be carried by an individual.

2. The portable water treatment system of claim 1 wherein each of the top and bottom plates are generally pentagonal ; and
wherein the central support extends between a central portion of the top plate and a central portion of the bottom plate; and
wherein the external supports include five external supports that extend between the top plate and the bottom plate about the periphery of the exoskeleton.

3. The portable water treatment system of claim 2 wherein the exoskeleton includes a top half and a bottom half, wherein the water pump is disposed in the bottom half of the exoskeleton.

4. The portable water treatment system of claim 3 further including a control panel, the control panel mounted between a pair of adjacent external supports.

5. The portable water treatment system of claim 4 wherein the control panel includes a water inlet and a water outlet, a first flexible water line extending from the water inlet to one of the water pump and the water treatment component and a second flexible water line extending from the water outlet to one of the water pump and the water treatment component.

6. The portable water treatment system of claim 5 wherein the water treatment component includes a first water filter assembly and a second water filter assembly, each water filter assembly including a pressure vessel secured to the central support and a filter cartridge removably fitted within the pressure vessel.

7. The portable water treatment system of claim 6 wherein the water pump includes an integrated pressure switch, the pressure switch permitting activation of the water pump only in the absence of water pressure.

8. The portable water treatment system of claim 7 further including a visible light source mounted to the central support, the visible light source electrically coupled to a power inlet on the control panel, whereby the visible light source receives power from an external power supply connected to the power inlet.

9. The portable water treatment system of claim 8 wherein the external supports are arranged in a radially symmetric pattern about the periphery of the exoskeleton with the gap between adjacent external supports being greater than a width of the filter cartridges, whereby the filter cartridges can be removed and replaced through the gap.

10. A portable water treatment system comprising:
an exoskeleton including a top plate, a bottom plate, a central axis extending through the top and bottom plates, a central support positioned proximate the central axis, and a plurality of external supports, the central support connecting to the top and bottom plates and extending from a central portion of the top plate to a central portion of the bottom plate, the plurality of external supports including at least five external supports spaced outwardly from the central support to define an outer periphery of the water treatment system, the at least five external supports connecting to and extending between the top and bottom plates in a radially symmetric pattern to be approximately evenly spaced about the outer periphery of the exoskeleton;
a control panel mounted between a pair of adjacent external supports, the control panel including a power inlet, a water inlet and a water outlet;
a water pump mounted to the central support; and
first and second water filter assemblies, each water filter assembly including a pressure vessel mounted to the central support and a filter cartridge removably fitted within the pressure vessel, wherein the water pump and water filter assemblies are fully disposed within the confines of the at least five external supports, and wherein the water treatment system can be carried by an individual.

11. The portable water treatment system of claim 10 including a water flow path in which the water pump is disposed between the first water filter assembly and the second water filter assembly, whereby water entering the water pump has been filtered by the first water filter assembly.

12. The portable water treatment system of claim 11 wherein the first and second water filter assemblies are vertically stacked and mounted to the central support opposite the water pump.

13. The portable water treatment system of claim 12 further including a light source mounted to the central support adjacent the top plate, the light source being electrically coupled to the power inlet to receive power from an external power source.

14. The portable water treatment system of claim 13 further including a bypass valve to allow pressurized water to flow through the first and second water filter assemblies without assistance from the water pump.

15. The portable water treatment system of claim 13 wherein the water pump includes an integrated pressure switch, the pressure switch permitting activation of the water pump only in the absence of water pressure.

16. The portable water treatment system of claim 10 wherein each pressure vessel is mounted to the central support by a mounting bracket, each mounting bracket including at least one mounting tab extending through the central support and affixed thereto by a fastener.

17. The portable water treatment system of claim 10 wherein the central support has a top end with at least one top mounting flange and a bottom end with at least one bottom mounting flange, wherein the central support is affixed to the top plate by a fastener extending between the top mounting flange and the top plate and is affixed to the bottom plate by a fastener extending between the bottom mounting flange and the bottom plate.

18. The portable water treatment system of claim 10 wherein a gap between at least two adjacent external supports being greater than a width of each of the filter cartridges, whereby the filter cartridges can be removed and replaced through the gap without removal of any of the external supports from the exoskeleton.

19. The portable water treatment system of claim 10 wherein each of the top plate and the bottom plate is generally pentagonal in peripheral shape with five corners and has a mounting flange disposed in each of the corners; and     wherein each external support is connected between one of the top plate mounting flanges and one of the bottom plate mounting flanges.

\* \* \* \* \*

UNITED STATES PATENT AND TRADEMARK OFFICE
CERTIFICATE OF CORRECTION

| | | |
|---|---|---|
| PATENT NO. | : 11,878,917 B2 | Page 1 of 1 |
| APPLICATION NO. | : 17/306050 | |
| DATED | : January 23, 2024 | |
| INVENTOR(S) | : John E. Sztykiel, Timothy A. Gerber and Shabtai C. Hirshberg | |

It is certified that error appears in the above-identified patent and that said Letters Patent is hereby corrected as shown below:

In the Specification

Column 7, Line 20, "exoskeletonl2" should be --exoskeleton12--

Column 9, Line 60, "HF-SQHWH12" should be --HF-5QHWH12--

Signed and Sealed this
Twenty-seventh Day of February, 2024

Katherine Kelly Vidal
*Director of the United States Patent and Trademark Office*